United States Patent [19]

Henderson

[11] 3,748,030
[45] July 24, 1973

[54] FILM CONTROL IN MOTION PICTURE PROJECTORS
[75] Inventor: James B. Henderson, Duarte, Calif.
[73] Assignee: Bell & Howell Company, Chicago, Ill.
[22] Filed: Dec. 22, 1971
[21] Appl. No.: 211,021

[52] U.S. Cl. .............................. 352/124, 352/173
[51] Int. Cl. ............................................ G03b 21/44
[58] Field of Search ..................... 352/124, 159, 173

[56] References Cited
UNITED STATES PATENTS
3,201,020  8/1965  Chernianskyj et al. ............... 226/91
3,609,022  9/1971  Schwartz .......................... 352/159 X
3,658,276  4/1972  Hayami ........................... 352/124 X Primary Examiner—Samuel S. Matthews
Assistant Examiner—Michael L. Gellner
Attorney—Hayden A. Carney et al.

[57] ABSTRACT

A motion picture projector includes a film supply reel, an upper shuttle loop sprocket, a gate assembly which includes a frame-by-frame film advance mechanism, a lower shuttle loop sprocket, and a film takeup reel; these projector components are disposed serially along a film path which traverses an optical axis within a shuttle loop defined between the sprockets. The reels are of very large capacity and have substantial inertia when fully or even partially loaded.

In this context, the invention provides mechanisms for controlling film tension at the sprockets to preserve the film and the definition of the shuttle loop. A tension control mechanism is located nextadjacent each sprocket along the film path toward the adjacent reel. Each mechanism is operative, when the adjacent sprocket operates to feed film to the shuttle loop, to feed film to the sprocket at a rate greater than the sprocket film advance rate when the film tension in the path adjacent the mechanism exceeds a predetermined film tension level. The control mechanism adjacent the upper shuttle loop sprocket also functions, when that sprocket operates to extract film from the shuttle loop, to retard the rate at which film is taken from the upper sprocket in response to the presence in the adjacent film of a tension level in excess of a predetermined level.

Film handling apparatus is provided for the film within the shuttle loop and is operatively disengaged from the film during operation of the projector to display a film. During rewind and stand-by modes of projector operation, the film handling apparatus is operatively engaged with the film to define a film path between the sprockets which is of definite length. This apparatus includes means for disabling the frame-by-frame film advance mechanism when the apparatus is disposed to define the length of film between the sprockets.

17 Claims, 8 Drawing Figures

United States Patent [19]
Henderson

[11] 3,748,030
[45] July 24, 1973

Patented July 24, 1973

FIG_1

Patented July 24, 1973

FILM CONTROL IN MOTION PICTURE PROJECTORS

INCORPORATION BY REFERENCE

The description of this invention incorporates by reference the drawings and description of commonly-owned U.S. Pat. No. 3,201,020 issued Aug. 17, 1965 to J. Cherniavskyj et al. for Self-Threading Motion Picture Projector. This incorporation-by-reference is for the purposes of simplifying the drawings and descriptions of this invention, and also for the purpose of providing a clear and concise description of this invention.

The presently preferred embodiments of this invention illustrated and described herein are based upon and constitute modifications of projectors constructed as described in U.S. Pat. No. 3,201,020. It is suggested that U.S. Pat. No. 3,201,020 be read before or in conjunction with a reading of the following detailed description of this invention for best understanding of the structures and operation of this invention, and of how projectors according to this invention may be constructed to advantage.

In the accompanying drawings and description, reference numerals between 1 and 116, inclusive, refer to structure which is illustrated and described in U.S Pat. No. 3,201,020, whereas reference numerals 120 and higher refer to structures provided in accord with the present invention.

Field of the Invention

This invention pertains to film handling and film tension control in motion picture projectors.

Background of the Invention

The Prior Art and Its Problems

Practically all motion picture projectors are arranged to provide a shuttle loop in the film path across the optical (projection) axis. A shuttle loop is required because the actual movement of the film across the optical axis must be on a frame-by-frame basis, whereas film is supplied to and extracted from the shuttle loop on a continuous basis by sprocket wheels at the ends of the shuttle loop. The sprocket wheels carry teeth which cooperate in sprocket holes formed in the film along one or both margins of the film. In order that the projector may function properly, the net film advance rate past the optical axis (on a frame-by-frame basis at 24 frames per second, in the case of 16 mm. film) and the net rate of film movement into and out of the shuttle loop continuously by the sprockets must be equal.

The familiar effect of frame jump or chatter is a result of film sprocket hole mutilation. A significant cause of sprocket hole mutilation in motion picture film is excess tension in the film adjacent the sprockets outside the shuttle loop. If the film tension is too high, the sprockets may lose a frame on the film, i.e., the sprocket at the input end of the shuttle loop may pass only 23 or less frames of film to the shuttle loop in any given second, or the sprocket at the exit end of the loop may allow 25 or more frames to be pulled from the shuttle loop. The tendency of a sprocket to lose a frame increases as the tension in the film adjacent the sprocket increases. Also, if any sprocket holes in the film have been mutilated (e.g., elongated) or destroyed (a result, principally, of excess film tension), then the tendency of the sprocket to lose a frame is greatly increased.

In motion picture projectors adapted for home use and the like, operational simplicity of the projector and considerations of cost argue against the provision of mechanisms for regulating film tension adjacent the shuttle loop sprockets. Projectors for conventional theaters and the like need not be simple to operate because they are operated by skilled professional projectionists, nor need they be portable; accordingly, large, heavy-use projectors for conventional theaters and the like may and often do include film tension control devices which greatly complicate the task of threading the film into the projector.

U.S. Pat. No. 3,617,117, for example, describes a motion picture projection system adapted for use in commercial aircraft and in which reels of great capacity are used; these reels may be thirty inches or more in diameter. To enable use of the system in aircraft, weight must be conserved in the system wherever possible; systems constructed to date in accord with U.S. Pat. No. 3,617,117, therefore, used modified forms of 16 mm. projectors designed for home use, specifically Bell & Howell Series 500 projectors.

The unusually large film reels found in systems in accord with U.S. Pat. No. 3,617,117 possess considerable inertia when loaded. Thus, even though these reels may be fitted with special tension sensitive drive mechanisms, they often produce considerable tension in the film adjacent the shuttle loop sprockets, thereby rendering the projectors susceptible to the familiar problem of frame jump. Because the projectors in such systems are located in relatively inaccessible places in the aircraft, the problem of frame jump, once encountered, cannot readily be corrected.

It is apparent, therefore, that a need exists for simple, compact and effective structure, useful in the context of a motion picture projector designed for home use and the like, for controlling the tension in film adjacent the shuttle loop sprockets and for maintaining film tension in this area within acceptable low levels.

The rewinding of film in a home projector conventionally is accomplished independently of the mechanisms used to move film through the projector during showing of a movie. That is, in a projector designed for home use, film is rewound by threading film directly from the filled takeup reel to the empty supply reel, and by powering the supply reel to wind in film from the takeup reel. The system of U.S. Pat. No. 3,617,117, however, relies upon the movement of film from the takeup reel to the supply reel along the same film path as is used during display of the film. This manner of rewinding of the film subjects the film to handling by the frame-by-frame advance mechanism of the projector which, by its nature, can destroy film sprocket holes if a frame is lost from the shuttle loop. Frame-by-frame forward advance of film within the shuttle loop is essential to intelligible display of the film, but frame-by-frame movement of the film during reverse (rewind) mode operation is only a source of potential mutilation or destruction of the film. Thus, a need exists for apparatus responsive to reverse mode operation of a projector adapted for home use for effectively disabling the frame-by-frame film advance mechanism.

U.S. Pat. No. 3,617,117 has been mentioned above primarily because this patent shows an environment in which the improvements of this invention have utility.

Workers skilled in the art and science of motion picture projectors will readily appreciate that this invention has utility in projection systems apart from those arranged for use in the passenger spaces of commercial aircraft. For example, projection systems incorporating large film storage reels may be used in small or one-man theaters. Such projection systems have large film storage capacity so that one man may perform the functions of projectionist, ticket salesman, and popcorn vender. To be useful in such areas, the projector should be easy to thread and require no monitoring during operation to display a film. The tension controlling features of this invention are useful in such projection systems, especially where the projector mechanism is in large part one designed for home use.

SUMMARY OF THE INVENTION

This invention provides simple, effective, compact and reliable apparatus for controlling film tension in a projector adjacent the shuttle loop sprockets to eliminate the tendency of the sprockets to lose a frame. Because the apparatus is compact, it may be used to advantage in projectors originally designed for home use and the like. Also, this invention provides apparatus for disabling the frame-by-frame film advance mechanism of a projector when the projector is operated in reverse mode for rewinding film, for example. Thus, this invention may be used to enhance the reliability of projection systems embodying the invention of U.S. Pat. No. 3,617,117, for example, as well as other projection systems whether or not they use very large capacity film storage reels.

Generally speaking, this invention is provided in the context of a motion picture projector which includes a film supply reel, an upper shuttle loop sprocket, a gate assembly which includes a frame-by-frame film advance mechanism, a lower shuttle loop sprocket, and a film takeup reel; these components are arranged serially along a film path which traverses a projector optical axis within a shuttle loop between the sprockets. In this context, this invention provides film tension control means disposed along the film path next adjacent one of the sprockets toward the adjacent reel. The control means is operative in response to a film tension level in excess of a predetermined tension level in the adjacent film for driving film toward the sprocket at a rate which is greater than the rate of film advance by the one sprocket.

Also, in this context, this invention provides means responsive to reverse mode operation of the projector for disabling the frame-by-frame advance mechanism from effective advancing cooperation with the film path.

DESCRIPTION OF THE DRAWINGS

The above-mentioned and other features of this invention are more fully set forth in the following description of presently preferred embodiments of the invention, which description is presented with reference to the drawings of U.S. Pat. No. 3,201,020 which are incorporated by reference herein, and by reference to the accompanying drawings, wherein.

DESCRIPTION OF THE ILLUSTRATED EMBODIMENTS

The drawings and descriptions of U.S. Pat. No. 3,201,020 are incorporated herein by reference as though fully set forth at this point. The structures illustrated in U.S. Pat. No. 3,201,020 form the presently preferred environment within which the improvements provided by the present invention are defined.

Figure 1:
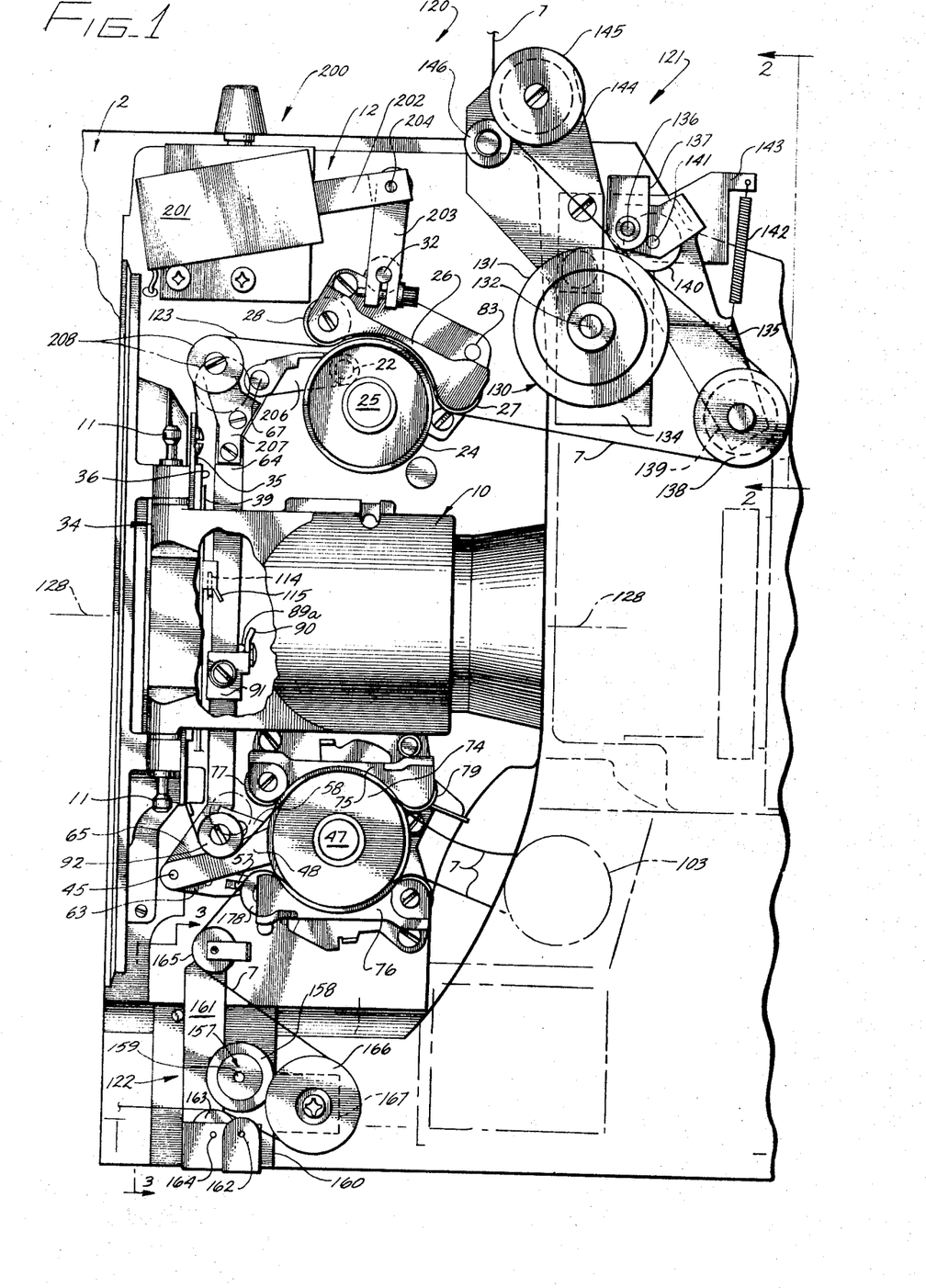
FIG. 1 is an elevation view, with parts broken away, of the projection station in a projection system according to this invention.

A comparison of accompanying FIG. 1 with FIG. 2 of U.S. Pat. No. 3,201,020 shows that the improvements provided by this invention may advantageously rely upon and incorporate substantial portions of the structure described in the referenced patent. Thus, as shown in accompanying FIG. 1, a projection station 120 is provided in an overall projection system which includes large diameter film supply and takeup reels (not shown, but see U.S. Pat. No. 3,617,117, for example). Film 7 is led from the supply reel to projection station 120 to pass in serial order through an upper film tension controlling mechanism 121, around upper shuttle loop sprocket 24, through gate assembly 34, around the upper portion of lower shuttle loop sprocket 74, around a sound drum 103, then around other portions of the lower shuttle loop sprocket, through a lower film tension controlling mechanism 122, and thence via suitable film guides and the like (not shown) to the film takeup reel. The portion of film 7 lying along the above-described path between upper shuttle loop sprocket 24 and the upper portions of lower shuttle loop sprocket 74 are disposed in that portion 123 of the film path which is commonly referred to as the shuttle loop. In accompanying FIG. 1, the mechanism of projection station 120 during reverse mode operation is shown in solid lines.

Sprockets 24 and 74 are essentially identical and are driven at equal rates in opposite directions in a continuous manner during operation of the projection station. Sprockets 24 and 74 are secured to sprocket drive shafts 25 and 47, respectively, adjacent the front face of projector housing 12. Adjacent the rear face of the housing, however, shafts 25 and 47 are secured to pinion gears 124 and 125, respectively, which cooperate with a worm gear 126 affixed to projector drive shaft 100 which is in turn driven by a projector drive motor 127 (see accompanying FIG. 5).

During forward mode operation of projector station 120, upper shuttle loop sprocket 24 functions to continuously feed film 7 into shuttle loop 123 at a rate of 24 frames per second (in the case of 16 mm. film, for example), and lower sprocket 74 functions to extract film from the shuttle loop continuously at a rate of 24 frames per second; during reverse mode operation of the projection station, the functions of sprockets 24 and 74 are reversed. Within the shuttle loop, a conventional pull-down mechanism operates during forward mode operation of the projection station to advance film within the shuttle loop toward lower sprocket 74 on a frame-by-frame basis at a rate of 24 frames per second. During reverse mode operation of the projection station, the pull-down mechanism (not illustrated in the accompanying drawings, but see FIGS. 4, 5 and 6 of U.S. Pat. No. 3,201,020) would advance film along the shuttle loop discontinuously on a frame-by-frame basis but for the operation of tight-loop rewind mechanism 200 described below.

Correct operation of projection station 120 is dependent upon there being a predetermined amount of film within the shuttle loop at all times. It is preferred that the improvements of this invention be provided in the context of a Series 500 Bell & Howell motion picture projector; such projectors are constructed for handling 16 mm. film, and in such projectors it is preferred that the quantity of film defining shuttle loop 123 correspond to 27 consecutive frames of the 16 mm. film. It is also preferred that the film within the shuttle loop be distributed within the shuttle loop with approximately half the length of the shuttle loop being disposed above the optical axis 128, and approximately half the length of the shuttle loop being disposed below the optical axis adjacent lower shuttle loop sprocket 74. The desired distribution of film within the shuttle loop cannot be maintained if the sprocket holes in film 7 are mutilated or destroyed such that teeth 88 on the shuttle 87 of the pull-down mechanism cannot properly engage the film. Similarly, sprockets 24 and 74 cannot function correctly to feed film to the shuttle loop and to extract film from the shuttle loop at the rate of 24 frames during each second of operation of the projector if the film sprockets holes are mutilated or destroyed such that the circumferential teeth 129 (see accompanying FIG. 8) on the sprockets cannot properly engage the film. It is apparent, therefore, that the presence of mutilated or destroyed sprocket holes in film 7 renders the projector susceptible to malfunction during the display of a program defined by film 7. To the extent that the film is under undesired levels of tension adjacent sprockets 24 and 74 and the film carries mutilated or destroyed sprocket holes, then it is apparent that the likelihood exists that one or both of the sprockets may lose a frame relative to the film and feed less film than is desired, or extract more film than is desired, from the shuttle loop during each second of operation of the projector. Thus, the efficient and reliable operation of projection station 120 is in large measure dependent upon film 7 being free of destroyed or mutilated sprocket holes.

Mutilation or destruction of the sprocket holes of film 7 is produced in many cases by there being too great a level of tension present in the film as it approaches or leaves the shuttle loop via sprockets 24 and 74 during forward or reverse mode operation of the projector. It is apparent, therefore, that it is desirable that the film, in those portions of the film path through projection station 120 lying adjacent to sprockets 24 and 74 and outside of shuttle loop 23, be at acceptable low tension levels if sprocket hole mutilation or destruction is to be avoided, Film tension controlling mechanisms 121 and 122 are provided in projection station 120 to assure that film 7 is presented to and led from sprockets 24 and 74 at safe tension levels during operation of the projection station. The provision of control mechanisms 121 and 122 is particularly desirable where the film supply and takeup reels are of greatly increased capacity and thereby possess considerable angular inertia, as is the case where projection station 120 is provided in the context of the projection system described in U.S. Pat. No. 3,617,117, for example.

Figure 2:
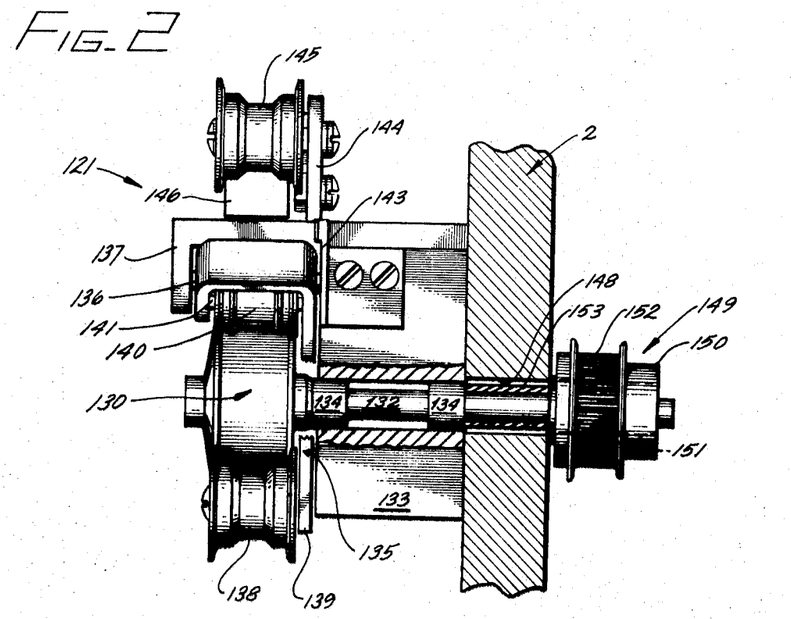
FIG. 2 is a view taken along lines 2—2 in FIG. 1.

As shown in accompanying FIGS. 1 and 2, a puck drum 130, equipped with a circumferential rubber tire 131, is secured to a shaft 132 which is disposed parallel to drive shaft 25 for upper shuttle loop sprocket 24. Shaft 132 is disposed adjacent the path of film 7 between sprocket 24 and the film supply reel closely adjacent to the upper sprocket. Shaft 132 is rotatably mounted within a bearing block 133 by suitable bearings 134. The bearing block is affixed to frame plate 2 adjacent the front of projector housing 12. Bearing block 134 is sized so that puck drum 130 and the other rollers and rolls of control mechanism 121 are spaced the same distance from frame plate 2 as sprockets 24 and 74; thus, the film path through projection station 120 lies in a common plane within which optical axis 128 is also disposed.

A drive arm 135 is pivoted to bearing block 134 by a pivot shaft 136 carried by a support bracket 137 secured to the bearing block. Pivot shaft 136 is parallel to shaft 132 so that drive arm 135 is pivotable about shaft 136 in a plane perpendicular to shaft 132. An idler roller 138 is rotatably mounted to a lower end 139 of the drive arm 135. A pinch roller 140 is carried by drive arm 135 between pivot 136 and idler roller 138. The shaft 141 for the pinch roller is carried by the drive arm very close to pivot 136. Accordingly, drive arm 135 manifests a large mechanical advantage in response to forces applied to the drive arm via idler roller 138. Clockwise movement of the drive arm about its pivot moves pinch roller 140 toward engagement with the adjacent surface of puck tire 131. Drive arm 135 is biased to rotate counterclockwise about pivot 136 by a return spring 142 which is coupled between the drive arm at about its midlength and a lug 143 extended appropriately from bearing block 134. An idler carrier plate 144 is mounted to the bearing block and extends generally along the film path in a direction toward the supply reel from the puck. An idler roller 145 is rotatably mounted to the carrier plate for rotation about an axis parallel to and spaced from puck shaft 132. A keeper roller 146 is rotatably mounted to the carrier plate adjacent idler roller 145.

As shown in accompanying FIG. 1, the desired path through projection station 120 to upper shuttle loop sprocket 24 is first between idler roller 145 and keeper roller 146 from the supply reel, then between pinch roll 140 and the periphery of puck tire 131, and then around a substantial portion of the circumference of idler roller 138 to guide roll 27 associated with sprocket 24. The definition of the film path in the vicinity of control mechanism 121 is such that the included angle between the legs of the film path adjacent idler roller 138 (i.e., between pinch roller 140 and roller 138 and between guide roll 27 and roller 138) is an acute angle, and the pivot axis 136 for the drive arm is outside this included angle. Accordingly, drive arm 135 is sensitive to the tension in film 7 between idler roller 138 and sprocket 24, as well as between the idler roller 145 and the pinch roller 140.

Spring 142 is selected so that, when film 7 is subjected to tension between idler roller 138 and sprocket 27 at a level equal to or less than a tension level established as being adequate to assure that sprocket 24 cannot operate to mutilate or destroy sprocket holes in the film, the film rides loosely between pinch roll 140 and the puck tire. On the other hand, as soon as the tension in the film between idler roller 138 and sprocket 24 exceeds the desired level, drive arm 135 is displaced clockwise about pivot 136, against the bias of spring 142, to displace the film at the pinch roll into contact with puck tire 131. Puck shaft 132 is continuously rotated in a clockwise direction during forward mode operation of the projection station at a rate which is so selected relative to the effective diameter of the puck that the peripheral surface of puck tire 131 has a velocity greater than the peripheral velocity of sprocket 24. Therefore, as soon as mechanism 121 senses that film 7 passing through the mechanism has a tension level greater than the predetermined tension level associated with the stiffness of spring 142, the mechanism responds to such increased tension to move the film into contact with the puck tire to overdrive the film through mechanism 121 relative to sprocket 24. Such overdriving action of the puck produces an immediate reduction in the tension of film approaching sprocket 24.

Figure 5:
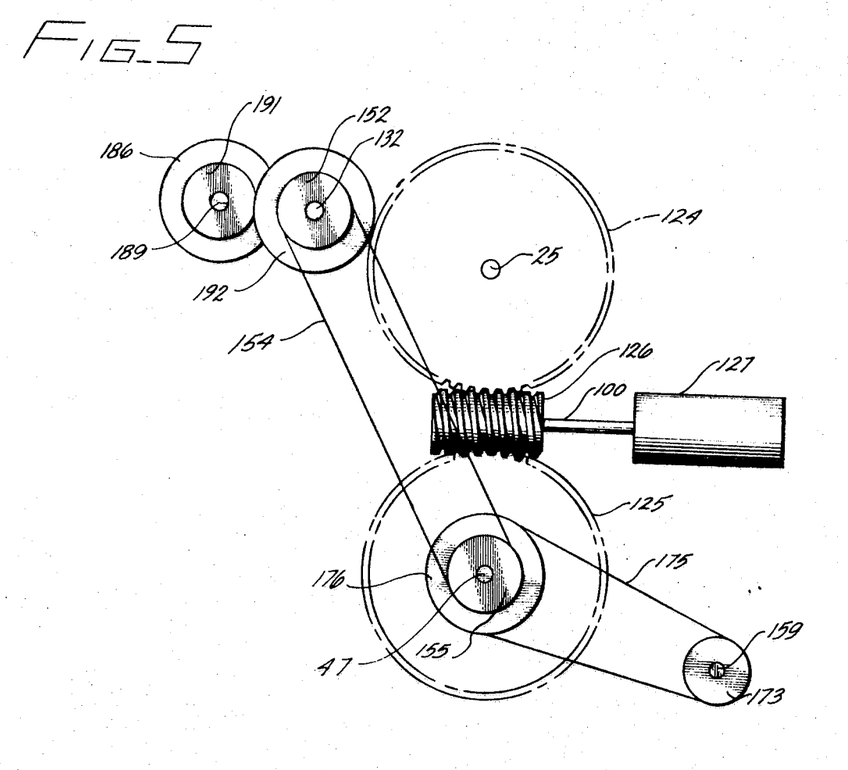
FIG. 5 is a schematic view of a portion of the drive mechanism for the projector station shown in FIG. 1.

Referring to accompanying FIGS. 2 and 5. Puck shaft 132 extends from the rear face of bearing block 134 through an oversized opening 148 in frame plate 2 a pulley assembly 149. Pulley assembly 149 includes a hub 150 which is mounted to the rear end of shaft 132 by an overrunning clutch 151. The exterior of hub 150 carries a timing belt pulley 152. Hub 150 is held in a desired position axially of puck shaft 132 by suitable means which preferably includes a spacer sleeve 153 disposed about the shaft within aperture 148. Clutch 151 is disposed between shaft 132 and hub 150 so that clockwise rotation of the hub (when viewed from the left in FIG. 2) is transferred by the clutch to shaft 132. Counterclockwise rotation of the hub relative to the shaft is accommodated and permitted by clutch 151. A timing belt 154 is engaged between pulley 152 and a small diameter pulley 155 secured to lower sprocket drive shaft 47 adjacent gear 125. It is apparent, therefore, that the clockwise rotation of puck 130 is synchronized to the rotation of upper shuttle loop sprocket 24; by virtue of the relative diameters of pulleys 155, 152 and puck 130, the puck has a peripheral speed when rotated clockwise which is a selected amount greater than the peripheral speed of upper sprocket 24 when the latter is rotated counterclockwise, as is the case during forward mode operation of projection station 120.

During reverse mode operation of projection station 120, as in the rewinding of film from the takeup reel to the supply reel as where projection station 120 is a component of a projection system of the type described in U.S. Pat. No. 3,617,117, for example, the principal locus of the problem of excess film tension is shifted from adjacent upper sprocket 24 to adjacent lower sprocket 74. Accordingly, lower film tension control mechanism 122 is provided along the path of film 7 nextadjacent lower sprocket 74 in a direction along the film path from the sprocket toward the takeup reel. Mechanism 122 is provided for regulating the tension in film approaching the lower sprocket to maintain the film tension within acceptable levels below the threshold of sprocket hole mutilation or destruction by sprocket 74.

Figure 3:
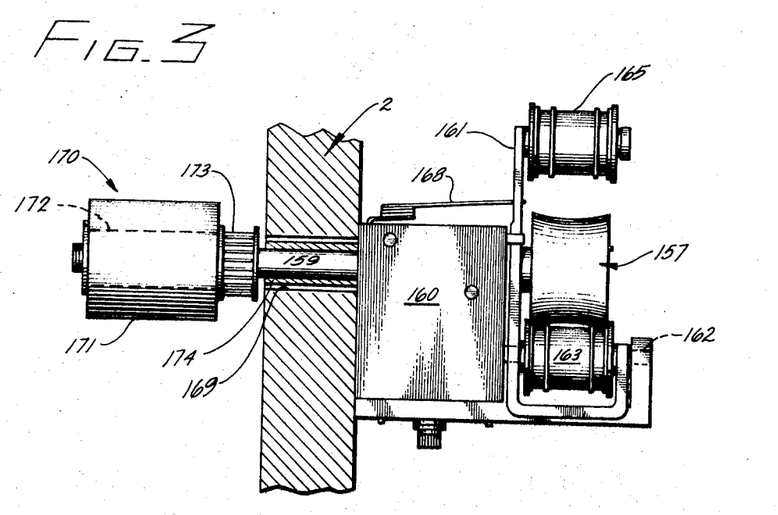
FIG. 3 is a view taken along lines 3—3 in FIG. 1.

As shown in accompanying FIGS. 1 and 3, lower film tension control mechanism 122 includes a puck wheel 157, the exterior surfaces of which are defined by a rubber tire 158, carried by a shaft 159 rotatably mounted in a bearing block 160 by suitable bearings (not shown, but similar to bearings 134 for upper puck shaft 132). A drive arm 161 is pivoted at 162 to bearing block 160 at a location substantially directly below puck shaft 159. As shown in accompanying FIG. 1, drive arm 161 is of substantially L-shaped configuration when viewed in elevation, and carries a pinch roll 163 rotatable about an axis 164. Pinch roll axis 164 is disposed adjacent the intersection of the horizontal and vertical legs of the L-shaped drive arm, whereas pivot axis 162 for the drive arm relative to bearing block 160 is defined adjacent the end of the horizontal shorter leg of the drive arm. An idler roller 165 is rotatably mounted to the upper end of the vertical leg of the drive arm adjacent the guide roll 178 (shown but not numbered in U.S. Pat. No. 3,201,020) around which film 7 is led from the interface between lower shuttle loop sprocket 74 and lower guide shoe 76. Another idler roller 166 is rotatably mounted on a support lug 167 which extends to the right from bearing block 160 so that idler roller 166 is disposed immediately adjacent lower puck 157.

The path of film 7 from sprocket 74 is around idler roller 165 in such a manner that tension in the film induces drive arm 161 to rotate clockwise about pivot 162. From roller 165, the film path is around the portion of idler roller 166 opposite (not adjacent) puck 157, then between the puck and pinch roll 163 and onward toward the takeup reel. This threading of film 7 through control mechanism 122 is such that when drive arm 161 rotates clockwise about pivot 162, pinch roll 163 moves toward puck 157 and tends to urge the film between it and the puck into intimate engagement with the tire carried by the puck. A spring 168 is coupled between bearing block 160 and drive arm 161 for biasing the drive arm to rotate counterclockwise about its pivot 162. The stiffness of spring 168 is selected so that when the tension in film 7 adjacent sprocket 74 exceeds that tension level which has been determined to constitute the threshold of sprocket hole mutilation or destruction by the sprocket, drive arm 161, in response to film tension sensed by it via idler roller 165, rotates clockwise about pivot 162 sufficiently to cause pinch roll 163 to force the adjacent film into contact with puck 157.

During reverse mode operation of projection station 120, shaft 159 is rotated counterclockwise at a rate such that the peripheral speed of puck 157 exceeds, by a selected amount, the peripheral speed of lower shuttle loop sprocket 74. Therefore, if the tension in film 7 immediately adjacent sprocket 74 exceeds the mutilation threshold tension level, this fact is sensed by mechanism 122 and the film is operatively engaged in driving relationship with puck 157 so that the puck functions to overdrive the film relative to sprocket 74. Overdriving of the film adjacent the sprocket relative to the sprocket results in the film tending to go slack adjacent the sprocket. It is apparent, therefore, that control mechanism 122 functions, during reverse mode operation of projection station 120, to maintain film 7 adjacent lower shuttle loop sprocket 74 at tension levels which are below the sprocket hole mutilation threshold tension level. Sprocket 74 is able to operate on low tension film throughout reverse mode operation of the projection station without the likelihood that the lower sprocket will mutilate film 7 or lose a frame relative to the predetermined length of film in shuttle loop 123.

The drive of lower puck 157 is illustrated in accompanying FIGS. 3 and 5. Puck shaft 159 extends rearwardly from bearing block 160 through an oversized aperture 169 formed in frame plate 2 to a pulley assembly 170. The pulley assembly includes a hub 171 which is mounted to the rear end of shaft 159 by an overrunning clutch 172. The clutch is so disposed between the hub and shaft 159 that the hub is not permitted to rotate counterclockwise relative to the shaft (viewing the shaft end-on from the right in FIG. 3), but clockwise rotation of the hub relative to the shaft is accommodated and permitted by the clutch. A timing belt pulley 173 is carried by hub 171 coaxially of the shaft adjacent the rear of frame plate 2. The pulley assembly is held in the desired position axially of shaft 159 by suitable means which preferably include a spacer sleeve 174 disposed about the shaft between bearing block 160 and the pulley assembly. A timing belt 175 is engaged between pulley 173 and a large diameter pulley 176 which is affixed to the rear end of lower sprocket shaft 47 between pulley 155 and gear 125. It is apparent, therefore, that during reverse mode operation of projector station 120, puck 157 is driven counterclockwise at a rate such that the periphery of the puck has a velocity which is a selected amount greater than the peripheral velocity of lower shuttle loop sprocket 74.

Film tension control mechanisms 121 and 122 are therefore seen to function during both forward and reverse mode operation of projection station 120 to supply film at low tension levels to that one of sprockets 24 or 74 which operates to supply film to shuttle loop 123. Accordingly, the input sprocket to the shuttle loop is not required to pull against film at high tension levels, with the result that the tendency for the sprocket to mutilate the sprocket holes formed in the film is eliminated. Also, the likelihood that the supply sprocket will pass less than 24 frames of film for any given second of operation of the projection station is greatly reduced.

Figure 4:
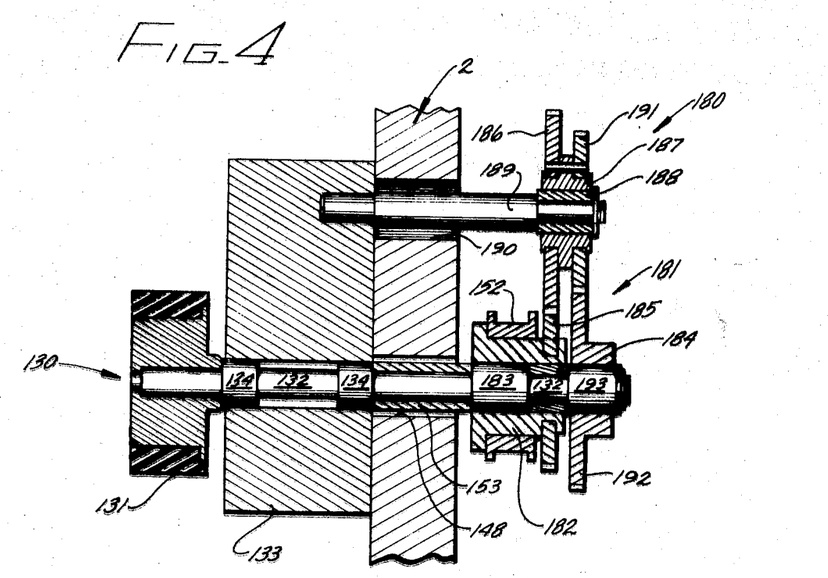
FIG. 4 is a cross-sectional elevation view of another film tension controlling mechanism for use with the upper shuttle loop sprocket in the projector station shown in FIG. 1.

Another film tension control mechanism 180 is illustrated in accompanying FIG. 4 and may be used if desired in place of film tension control mechanism 121, particularly in cases where the film adjacent upper shuttle loop sprocket 24 outside of shuttle loop 123 is likely to be subjected to unduly high tension levels during both forward and reverse modes of operation of projector station 120. Mechanism 180 is substantially identical to control mechanism 121 except in the manner by which puck shaft 132 is driven by timing belt 154. The drive arrangement for puck shaft 132 in control mechanism 180 includes a pulley assembly 181 which includes a hub 182. Timing belt pulley 152 is carried by the exterior of hub 182. The hub is mounted on the rear end of puck shaft 132 by an overrunning clutch 183 and a journal bearing 184. Clutch 183 is arranged to prevent hub 182 from rotating clockwise relative to shaft 132 (viewing the shaft end-on from the left in FIG. 4), but to accommodate and permit counterclockwise rotation of the hub relative to the shaft. A pinion gear 185 is carried by hub 182 adjacent timing belt pulley 152 at the end of the hub opposite from frame plate 2. Gear 185 meshes with a large diameter idler gear 186 secured to a gear hub 187 mounted by a journal bearing 188 to the rear end of an idler gear shaft 189. The idler gear shaft passes through an oversize opening 190 in frame plate 2 to bearing block 133 where the idler gear shaft is supported. A small diameter idler gear 191 is also carried by idler gear hub 187 and meshes with a drive gear 192. Drive gear 192 has a greater effective diameter than pinion gear 185 and is mounted to puck shaft 132 by an overrunning clutch 193. Clutch 193 is mounted to the shaft in the same sense as clutch 183, i.e., clutch 193 prevents gear 192 from rotating clockwise relative to shaft 132 but accommodates and permits counterclockwise rotation of its gear relative to the puck shaft.

During forward mode operation of film tension control mechanism 180, puck 130 is rotated clockwise when viewed as in FIG. 1 at a rate determined by the angular velocity of timing belt pulley 152. During such forward mode operation, gear 192 is driven via idler gears 186 and 191 from pinion gear 185 with an angular velocity which is less than that of timing belt pulley 152. Accordingly, during forward mode operation of mechanism 180, drive gear 192 tends to rotate counterclockwise relative to shaft 132 and this manner of rotation of the gear is the type of rotation accommodated and permitted by clutch 193. Therefore, during forward mode operation, control mechanism 180 functions in exactly the same way as control mechanism 121 to regulate and control the tension at which film is supplied to upper shuttle loop sprocket 24.

During reverse mode operation of projector station 120, timing belt pulley 152 is driven by belt 154 counterclockwise relative to shaft 132, and the gear ratio between pulley 152 and drive gear 192 is such that gear 192 is driven counterclockwise about the axis of shaft 132 but at a rate less than that of timing belt pulley 152. Clutches 183 and 193 accommodate these counterclockwise rotations about shaft 132 such that timing belt 154 is ineffective to drive shaft 132 counterclockwise.

During reverse mode operation of the projector station, idler roller 138 functions in the manner described above to sense the tension in film 7 being fed from upper shuttle loop sprocket 24 toward the control mechanism as this sprocket operates to extract film from shuttle loop 123. If idler roller 138 senses that the tension in film 7 between it and sprocket 24 is too great, i.e., the rate of film movement through control mechanism 180 is too great, drive arm 135 rotates clockwise about its pivot axis 141 so that the film between pinch roll 140 and puck 130 is forcefully driven by the pinch roll into frictional engagement with the puck tire. When this occurs, the film itself tends to drive puck 130 counterclockwise, and such counterclockwise rotation of the puck can be accommodated so long as shaft 132 is not driven counterclockwise at a rate greater than the counterclockwise rotation of drive gear 192 about the shaft axis. Counterclockwise rotation of shaft 132 at a rate greater than counterclockwise rotation of drive gear 192 about the shaft axis results in the gear appearing to rotate clockwise about the shaft. Clutch 193, however, prevents gear 192 from rotating clockwise about shaft 132. Accordingly, the maximum angular velocity of shaft 132 counterclockwise about its axis is defined by the rate at which drive gear 192 is driven counterclockwise about the shaft axis via the gears between it and timing belt pulley 152. The overall gear ratio defined by the train of gears 185, 186, 191 and 192 is selected so that the maximum counterclockwise angular velocity afforded to puck 130 is slightly less than the angular velocity of upper shuttle loop sprocket 24 during reverse mode operation of the projection station. It is seen, therefore, that when idler roller 138 senses an excess tension level in film 7 between it and sprocket 24, control mechanism 180 operates to move the film between pinch roll 140 and the puck into frictional engagement with the puck so that the puck operates as a brake or retardant to the motion of film past it. Puck 130, therefore, underdrives film 7 relative to sprocket 24 when mechanism 180 senses that the film adjacent the sprocket is subject to tension in excess of the mutilation threshold tension level. Underdriving of film 7 by film control mechanism 180 induces the film to go slack between it and sprocket 24. In this manner, control mechanism 180 operates to maintain tension in film 7 adjacent sprocket 24 at tension levels below the mutilation threshold tension level during reverse mode operation of projector station 120.

It will be appreciated that the drive for lower puck 157 may be modified in the same manner as mechanisms 121 and 180 differ from each other, thereby to impart an overdrive/underdrive operating characteristic to the lower film tension control mechanism.

Film tension control mechanisms 121, 122 and 180 described above may be used to advantage in any motion picture projector in which the likelihood exists that film will be subjected to undue tension levels adjacent the shuttle loop sprockets during forward or reverse mode operation of the projector. These mechanisms are particularly useful in projectors where the film supply and takeup reels are of increased capacity and therefore possess unusually high inertia. It is apparent, therefore, that film control mechanisms 121, 122 and 180 may be used to advantage in a projection system like that described in U.S. Pat. No. 3,617,117, notwithstanding the fact that the supply and takeup reels in such a system preferably are equipped with tension responsive drive mechanisms like those shown in U.S. Pat. No. 3,398,914, for example. The use of film tension control mechanisms 121, 122 and 180 is not dependent upon the incorporation in the projector station of apparatus according to referenced U.S. Pat. No. 3,201,020.

As noted above, U.S. Pat. No. 3,617,117 describes a projection system in which the rewinding operation is performed via the projection station. That is, during rewinding of film, the film moves along the same path as is defined through the projection system for dispaly of the information carried by a given length of film. The pull-down mechanism used to move film on a frame-by-frame basis through shuttle loop 123 must be operated during the use of the projectors of the system according to U.S. Pat. No. 3,617,117. The operation of the frame-by-frame film advance mechanism during reverse mode of such projectors, however, is a source of potential damage to the film, particularly where a frame is lost from the shuttle loop past either the upper shuttle loop sprocket or the lower shuttle loop sprocket during reverse mode operation. During forward mode operation, the film in a conventional shuttle loop is slack adjacent both of the sprockets defining the end of the shuttle loop. Projection station 120, however, includes a mechanism 200 for maintaining the film in shuttle loop 123 under moderate acceptable levels of tension, at least adjacent the upper shuttle loop sprocket and preferably adjacent both sprockets, during reverse mode operation of the projector station. The maintenance of the shuttle loop film under moderate tension levels during reverse mode operation of the projector station assures that excess tension levels in the film outside the shuttle loop will be minimally effective to cause the shuttle loop sprockets to lose a frame relative to the predetermined length of film required to define a proper shuttle loop.

The projection station shown in accompanying FIG. 1 preferably uses a Series 500 Bell & Howell motion picture projector equipped with an AUTOLOAD self-threading mechanism (such as per referenced U.S. Pat. No. 3,201,020), but modified in the manner shown to accommodate film tension control mechanisms 121 and 122, for example, and also to accommodate mechanism 200, which is referred to herein as a tight-loop rewind mechanism.

Figure 6:
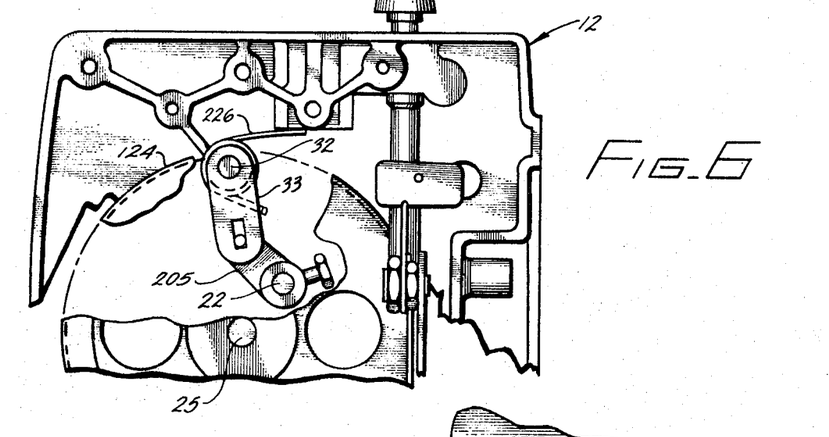
FIG. 6 is a fragmentary rear elevation view of a portion of the projection station shown in FIG. 1.

Tight-loop rewind mechanism 200 includes a solenoid 201 having a reciprocal armature 202. The solenoid is mounted to the front of projector housing 12 above the upper end of shuttle loop 123 so that the armature 202 is disposed above upper shuttle loop sprocket 24. The outer end of the armature is disposed above and spaced from pivot axis 32 of the self-threading mechanism shown in FIGS. 2 and 3 of referenced U.S. Pat. No. 3,201,020, for example. A link 203 is pivoted at 204 to the outer end of the solenoid armature. Link 203 is also securely clamped to pivot shaft 32 so that the pivot shaft is rotated in response to operation of solenoid 201. As shown best in accompanying FIG. 6, one end of a link 33 is fixed to shaft 32 within housing 12 and cooperates with a link 205 (a part of the structure described in U.S Pat. No. 3,201,020 but not numbered therein) affixed to pivot shaft 22 within the housing adjacent the drive gear for upper sprocket 24. Links 33 and 205 are so interconnected that clockwise rotation of pivot shaft 32 produces counterclockwise rotation of pivot shaft 22, and vice versa. The forward end of pivot shaft 22 is disposed between upper shuttle loop sprocket shaft 25 and guide roll 28 behind upper shuttle loop sprocket 24; guide roll 28 defines the upper end of shuttle loop 123. One end of a lever 206 is secured to the forward end of pivot shaft 22 and has its other end pivoted at 67 to the upper end of the vertically disposed, reciprocable connecting link 64. Lever 206, upon comparison of accompanying FIG. 1 with FIG. 2 of referenced U.S Pat. No. 3,201,020, will be seen to be a modification of lever 21 illustrated and described in the referenced patent. A bracket 207 is affixed to link 64 closely adjacent pivot 67 and mounts a rotatable idler roller 208.

An idler roller 92 is located adjacent the path of the film defining shuttle loop 123 near lower shuttle loop sprocket 47. Idler roller 92 is a component of the shuttle loop restoring mechanism described in referenced U.S. Pat. No. 3,201,020 and illustrated particularly in FIGS. 9 and 10 thereof. Idler roller 92 is disposed near the lower end of link 64 which is pivoted at 45 to a lever 48 which is mounted for rotation about shaft 47 for the lower sprocket. Pivot 45 is also associated with one end of a link 63 the other end of which is interconnected by pivot 57 to a lever 55 which has a projection 58 disposed above the support shaft for idler roller 92.

Tight-loop rewind mechanism 200 is illustrated in accompanying FIG. 1 in its actuated condition, which is the condition of the mechanism during reverse mode operation of projection station 120 for rewinding of film 7. In the actuated condition of mechanism 200, solenoid 201 is energized to retract armature 204, thereby to rotate pivot shaft 32 counterclockwise against the bias of a spring 68 (see accompanying FIG. 6) which is engaged between link 33 and housing 12. Such retraction of solenoid armature 202 produces clockwise rotation of pivot shaft 22 which, via lever 206, reciprocates link 64 upwardly so that idler roller 208 has the position illustrated in solid lines in accompanying FIG. 1. Such upward motion of link 64 produces downward movement of idler roller 92 to the position shown in solid lines in accompanying FIG. 1. This motion of idler roller 92 in response to upward movement of link 64 results from the interconnection of link 64 and roller 92 via link 63, pivot pin 57, lever 55 and projection 58. Upward movement of idler roller 208 and downward movement of idler roller 92 brings these rollers into engagement with the portion of film 7 which defines shuttle loop 123 and pulls the film taut over these rollers. Upward movement of lever 64 also causes cam 90 of bracket 91 to engage the end 89a of pin 89 to disable the frame-by-frame film advance mechanism, thereby preventing teeth 88 of shuttle 87 from engaging in the sprocket holes defined by film 7. Also, upward movement of link 64 causes projection 114 to engage cam bracket 115 and move pressure plate 39 out of contact with the film engaged between side guides 36 in gate assembly 34.

Solenoid 201 is wired so that it energizes when the control circuit for projection station 120 is operated to place the projection station in its reverse mode wherein lower shuttle loop sprocket 74 rotates counterclockwise to feed film into the shuttle loop, and upper shuttle loop sprocket 24 rotates clockwise to extract film from the shuttle loop. During such operation of the projector station, the frame-by-frame advance mechanism of the projector is disengaged and the film between idler rollers 92 and 208 moves freely through the gate assembly between pressure plate 36 and rear plate 35. On the other hand, when the control circuitry for projection station 120 is disposed to operate the projection station in its forward mode, solenoid 201 is not energized and spring 68 is effective upon link 33 to rotate pivot shaft 32 clockwise and to move link 64 downwardly. Downward movement of link 64 causes roller 208 to be moved into the position shown in broken lines in accompanying FIG. 1. Also, downward movement of link 64 results in lower idler roller 92 being moved to the position shown in broken lines in accompanying FIG. 1; this occurs by virtue of the above-described interconnection between link 64 and roller 92 via pivot 45, link 63, pivot pin 57, lever 55 and projection 58. When idler roller 92 is in the position shown in broken lines in accompanying FIG. 1, idler roller 92 functions as a component of the shuttle loop restoration mechanism. Also, downward movement of link 64 causes cam 90 to move clear of the end 89a of pin 89 whereby the frame-by-frame advance mechanism is placed into its operative condition; such movement also frees projection 114 from engagement with cam bracket 115 whereby pressure plate 39 is enabled to function in its desired manner. The movement of idler rollers 92 and 208 into the positions shown in broken lines in accompanying FIG. 1 places these rollers clear of the film defining shuttle loop 123. Thus, the frame-by-frame advance mechanism may operate in its intended discontinuous manner simultaneously with continuous operation of shuttle loop sprockets 24 and 74 to feed film to the shuttle loop and to extract film from the shuttle loop, respectively.

In view of the foregoing, it is apparent that when projection station 120 is operated in its reverse mode for the rewinding of film 7, mechanism 200 operates to engage the film within the shuttle loop. The structure of mechanism 200 is arranged so that when the shuttle loop film is engaged by roller 208, the film is under tension at levels below the mutilation threshold tension level. The tension of the film in the shuttle loop counteracts and tends to offset the tension in film outside the film loop, but adjacent to sprockets 24 and 74. It is apparent, therefore, that mechanism 200 is itself operative during reverse mode operation of projection station 120 to greatly reduce the tendency for either of sprockets 24 or 74 to lose a frame relative to film 7, and is also effective to produce significant control over the tension levels present in film 7 at and adjacent the shuttle loop sprockets. As a result, the presence of mechanism 200 means that there is a greatly reduced likelihood that sprockets 24 or 74 will operate during reverse mode operation of the projection station to mutilate or destroy the sprocket holes defined in film 7; this benefit is provided by tight-loop rewind mechanism 200 itself and is not dependent upon the presence in the projection station of film tension control mechanisms 121 and 122, for example. It is preferred, however, that a tight-loop rewind mechanism and the film tension control mechanisms be provided in combination within projection station 120 to reduce to the greatest extent possible the tendency of the film to malfunction at sprockets 24 or 74 or at the frame-by-frame advance mechanism, during either forward or reverse modes of the projection station.

It is preferred that solenoid 201 be connected to the control circuitry for projection station 120 so that the solenoid is energized during both reverse and standby modes of operation of the projector station. The standby mode of projector station 120 is a mode in which power is supplied to the projector station but drive motor 127 is not operated. The standby mode of the projection station may be used to advantage during the threading of film along the path illustrated in accompanying FIG. 1, for example.

Figures 7, 8:
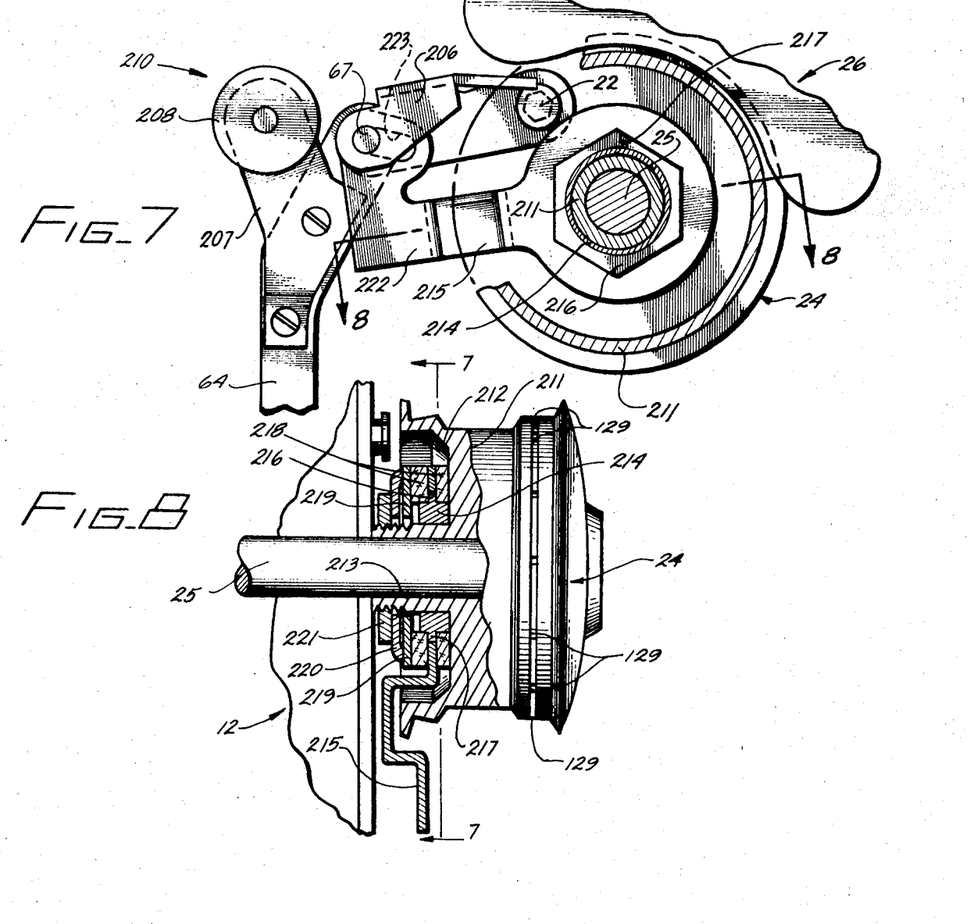
FIG. 7 is an enlarged fragmentary elevation view of another form of tight-loop rewind mechanism for the projection station shown in FIG. 1.
FIG. 8 is a cross-sectional view taken along lines 8—8 in FIG. 7.

Another tight-loop rewind mechanism 210 is illustrated in accompanying FIGS. 7 and 8 and differs from tight-loop rewind mechanism 200 only in the manner in which lever 206 is indexed to produce reciprocation of connecting link 64. Tight-loop rewind mechanism 210 does not include solenoid 201 or link 203, but it does include pivot shaft 32, link 33, link 205, pivot shaft 22 and spring 226 biased between projector housing 12 and link 32 in association with pivot shaft 32; spring 226 is substituted for spring 68 shown in U.S. Pat. No. 3,201,020. As shown in accompanying FIGS. 7 and 8, upper shuttle loop sprocket 24 includes a drum 211. The rear portion of the drum defines a cavity 212 which opens toward the front face of projector housing 12 concentric to the drive shaft 25 for the upper shuttle loop sprocket. Drum 211 is secured to shaft 25 by appropriate means (not illustrated) for rotation with the shaft. A sleeve 213 is connected to the drum and extends about shaft 25 to an externally threaded rear end disposed in substantial abutment with the front face of housing 12 coaxially of cavity 212. An axially bored bearing 214 for an actuating lever 215 is rotatably mounted about sleeve 213 around the unthreaded portion of the sleeve. The bearing has a circumferential flange 216 which, as shown best in accompanying FIG. 7, is preferably hexagonally configured when the bearing is viewed end-on. Flange 216 cooperates within a correspondingly configured opening 217 formed in an end of actuating lever 215 so that the actuating lever and bearing 214 are keyed together for rotation as a unit about shaft 25. Bearing flange 216 and the adjacent end of actuating lever 215 are disposed between a pair of friction disks 218. One of the friction disks has one of its faces abutted against the portion of drum 11 defining the base of cavity 212 and has its other face abutted against the adjacent faces of bearing flange 216 and actuating lever 215. The other friction disk has one of its faces abutted against the opposite surfaces of the bearing flange and the actuating lever, and its other face bearing against an annular pressure plate 219 disposed concentrically about sleeve 213 and keyed to the sleeve. An annular spring washer 220 is interposed between pressure plate 219 and a nut 221 engaged upon the externally threaded end of sleeve 123. Preferably friction disks 218 are defined by cork or some other material which manifests a high coefficient of friction against the metal used to define drum 211, bearing 216, actuating lever 215 and pressure plate 219.

As illustrated in accompanying FIG. 7, actuating lever 215 has an actuating end 222 in which is formed an elongated opening 223 through which pivot pin 67 is passed. Pivot pin 67 is affixed to the upper end of connecting link 64 and is snugly journalled within the adjacent end of lever 206. Accordingly, a rotatable connection is provided by pivot pin 67 between lever 206 and connecting link 64, whereas a slidable and rotatable connection is provided between actuating lever 215 and connecting link 64 via elongated slot 223.

Nut 221 is tightened against spring washer 220 sufficiently that bearing flange 216 and the inner end of actuating lever 215 are snugly clamped between friction disks 218. The frictional engagement of the friction disks with actuating lever 215 circumferentially of shaft 25 is sufficient that, when shaft 25 is rotated counterclockwise, as during forward mode operation of sprockets 24 to feed film 7 to shuttle loop 123, the torque imposed upon actuating lever 215 by the friction disks is sufficient to overcome the bias of spring 226 (a balance spring provided so that the friction clutch assembly works against substantially the same load for either direction of rotation of sprocket 24) as manifested at pivot pin 67 via links 34 and 205, shaft 22 and lever 206. Accordingly, during forward mode operation of a projector in which tight-loop rewind mechanism 210 is incorporated, idler rollers 208 and 92 are held in their retracted positions represented in broken lines in accompanying FIG. 1. During reverse mode operation of the projector, upper shuttle loop sprocket 24 rotates clockwise to extract film from shuttle loop 123. As the upper sprocket rotates clockwise, such rotation is effective via friction disks 218 to impart to actuating lever 215 a torque acting clockwise about shaft 25. Accordingly, as upper sprocket 24 begins to rotate clockwise, actuating lever 215 is indexed clockwise about shaft 25 with the bias of spring 226, thereby to move connecting link 64 upwardly so that idler roller 208 moves into film guiding and tautening engagement with the film in the upper portion of shuttle loop 123. As is apparent from the preceding description, upward movement of connecting link 64 produces downward movement of idler roller 92 into film guiding and tautening engagement with the film in the lower portions of the shuttle loop. Also, upward movement of the connecting link disengages the frame-by-frame film advance mechanism and disengages pressure plate 39 from engagement with the film in the vicinity of gate assembly 34. The benefits accruing from engagement of film in the shuttle loop by idler rollers 208 and 92 during reverse mode operation of the projector have been set forth above. The limit of upward movement of connecting link 64 is defined by the elongate extent of opening 223 formed in the operating end of actuating lever 215; in tight-loop rewind mechanism 200, this limit is defined by the throw of solenoid armature 202.

It is apparent, therefore, that tight-loop rewind mechanism 210 is responsive to reverse mode operation of a projector in which the mechanism is incorporated to disable the frame-by-frame film advancing mechanism from effective advancing cooperation with the film, and also to define a part of the film path (corresponding to the shuttle loop) which is of definite configuration and fixed length within which the film is held taut at moderate levels of tension well below the mutilation threshold tension level for the film. It is noted, however, that tight-loop rewind mechanism 210 may not be placed automatically into its operated position during standby mode operation of the projector from its show mode since, during standby mode operation, upper sprocket 24 is not rotating. Counterclockwise movement of the actuating lever about shaft 25 corresponds to operation of mechanism 210 into its unoperated state. Because mechanism 210 is in it unoperated state when the projector is placed in its standby mode, tight-loop rewind mechanism 200 constitutes the presently preferred tight-loop rewind mechanism according to this invention.

It will be apparent from the foregoing description that both tight-loop mechanisms 200 and 210 incorporate many of the same structural elements, features and operations as are provided in a self-threading mechanism of the type described in referenced U.S. Pat. No. 3,201,020. It is for this reason that it is presently preferred that a tight-loop rewind mechanism according to this invention be provided in the context of a motion picture projector originally designed and constructed for inclusion of the self-threading apparatus of U.S. Pat. No. 3,201,020.

It is noted that the provision of the tight-loop rewind mechanism according to this invention does not impair the function of idler roller 92 as a component of a shuttle loop restoring mechanism during forward mode operation of the projector.

It will be apparent that film tension control mechanisms 121, 122 and 180, on the one hand, and tight-loop rewind mechanisms 200 and 210, on the other hand, are all addressed to the same basic objective, namely, greatly reducing if not altogether eliminating the likelihood that the projector mechanism will act upon damaged or improperly conditined film at any time during its operation to produce mutilation of the sprocket holes defined in film 7. It is for this reason that it is preferred that a suitable film tension mechanism be used in conjunction with a suitable tight-loop rewind mechanism, although joint use of a film tension control mechanism with the tight-loop rewind mechanism is not essential to the realization of the benefits afforded by the improvements described above.

Tight-loop rewind mechanism 200 may be placed into its operated condition by putting the projector in its standby mode. Also, mechanism 210 may be actuated manually into its operated position when the projector is either off or in a standby mode. Tight-loop rewind mechanisms 200 and 210, when disposed in their operated conditions, substantially exactly define the path along which film 7 should be threaded through the shuttle loop for proper operation of the projector. Mechanisms 200 and 210 are so arranged that film may be threaded manually through the projector. The automatic film threading apparatus described in U.S. Pat. No. 3,201,020, however, is so arranged to prevent manual threading of film through the projector. Mechanisms 200 or 210, therefore, may be used to advantage in motion picture projectors intended for home and non-commercial use to precisely define the desired path for manual threading of film; such projectors would eliminate all discretion by the operator concerning how to thread film through the shuttle loop, thereby eliminating another significant cause of film jump or chatter.

Workers skilled in the art to which this invention pertains will readily recognize that the film tension control mechanisms and tight-loop rewind mechanisms described above may be modified or altered without departing from the scope of this invention. The specific structural arrangements illustrated in the accompanying drawings and described above have been presented for the purposes of example and because they constitute presently preferred embodiments of this invention. The foregoing description should not be construed as limiting the scope of this invention.

What is claimed is:

1. In a motion picture projector which includes a pair of film drive sprockets at opposite ends of a shuttle loop portion of a film path in the projector for continuously and synchronously feeding film to and from the shuttle loop during both forward and reverse modes of operation of the projector, and a shuttle-movement pull-down claw cooperating with the film path within the shuttle loop for advancing film along the path on a frame-by-frame basis, the improvement comprising means responsive to reverse mode operation of the projector for inhibiting a portion of the pull-down claw movement to disable the claw from frame-by-frame advancing cooperation with the film path.

2. Apparatus according to claim 1 wherein the inhibiting means includes means for engaging the film within the shuttle loop for defining a film path of definite configuration and extent between the sprockets during reverse mode operation of the projector.

3. Apparatus according to claim 2 wherein the film engaging means is operative to apply controlled tension to film engaged thereby.

4. Apparatus according to claim 2 wherein the projector includes a pressure plate disposed along the film path and resiliently biased toward the film for urging the film into cooperation with the frame-by-frame advancing means, and including means responsive to reverse mode operation of the projector for moving the pressure plate against the resilient bias therefor out of engagement with the film.

5. In a motion picture projector which includes a pair of film drive sprockets at opposite ends of a shuttle loop portion of a film path in the projector for continuously and synchronously feeding film to and from the shuttle loop in response to both forward and reverse mode operation of a projector drive motor, the improvement comprising film engaging means disposed along the film path within the shuttle loop portion thereof movable between an actuated state and an unactuated state, the film engaging means in its actuated state engaging film in the shuttle loop and substantially exactly defining the desired configuration of the film path through the shuttle loop, the film engaging means in its unactuated state being disengaged from the film path, and means responsive to forward mode operation of the projector motor for disposing the film engaging means in its unactuated state.

6. Apparatus according to claim 5 including means responsive to operation of the projector into a standby mode thereof for disposing the film engaging means in its actuated state.

7. Apparatus according to claim 5 wherein the film engaging means is arranged for manual operation from its unactuated to its actuated state.

8. In a motion picture projector which includes a pair of film drive sprockets at opposite ends of a shuttle loop portion of a film path in the projector for continuously and synchronously feeding film to and from the shuttle loop, the improvement comprising film engaging means disposed along the film path within the shuttle loop portion thereof movable between an actuated state and an unactuated state, the film engaging means in its actuated state engaging film in the shuttle loop and substantially exactly defining the desired configuration of the film path through the shuttle loop, the film engaging means in its unactuated state being disengaged from the film path, means responsive to operation of the projector for display of film for disposing the film engaging means in its unactuated state, and means responsive to operation of the projector in a reverse mode thereof for disposing the film engaging means in its actuated state.

9. In a motion picture projector which includes a pair of film drive sprockets at opposite ends of a shuttle loop portion of a film path in the projector for continuously and synchronously feeding film to and from the shuttle loop, and means cooperating with the film path within the shuttle loop for advancing film along the path on a frame-by-frame basis, the improvement comprising means responsive to reverse mode operation of the projector for disabling the frame-by-frame advancing means from effective advancing cooperation with the film path and including means for engaging the film within the shuttle loop for defining a film path of definite configuration and extent between the sprockets during reverse mode operation of the projector, the film engaging means including a pair of film guide rollers disposed along the film path within the shuttle loop adjacent the opposite ends of the shuttle loop with the frame-by-frame advancing means therebetween, and means operative upon initiation of reverse mode operation of the projector for driving the rollers from an unactuated position thereof in which the rollers are disengaged from the film to an actuated position of the rollers in which the rollers engage the film.

10. Apparatus according to claim 9 wherein one of the film guide rollers is an operative component of a shuttle loop restoration mechanism of the projector when disposed in its unactuated position.

11. Apparatus according to claim 9 including linkage means mounting the guide rollers and operatable between unactuated and actuated states for moving the guide rollers between their unactuated and actuated positions, and biasing means coupled to the linkage means for biasing the linkage means toward its unactuated state.

12. Apparatus according to claim 11 wherein the means for driving the rollers to the actuated position thereof includes a solenoid coupled to the linkage means for operating the linkage means to its actuated state against tee operation of the biasing means.

13. Apparatus according to claim 12 wherein the solenoid is connected for operation of the linkage means to its actuated state in response to operation of the projector in a standby mode thereof.

14. Apparatus according to claim 11 wherein the means for driving the rollers to the actuated position thereof is coupled to one of the sprockets and is responsive to reverse mode rotation of the sprocket for operating the linkage means to its actuated state against the operation of the biasing means.

15. Apparatus according to claim 14 wherein the means for driving the rollers is responsive to forward mode rotation of the sprocket for operating the linkage means from its actuated state to its unactuated state in response to forward mode operation of the sprocket.

16. Apparatus according to claim 14 wherein the driving means includes a lever journalled about a drive shaft for the one sprocket and connected to the linkage means, and frictional slip clutch means coupled between the one sprocket and the lever.

17. Apparatus according to claim 14 wherein the one sprocket is operative during reverse mode operation of the projector to withdraw film from the shuttle loop.

* * * * *